No. 699,199. Patented May 6, 1902.
P. J. LOCKWOOD.
GASKET AND SEAL FOR HYDROCARBON LIQUID CONTAINERS.
(Application filed Apr. 30, 1901.)
(No Model.)
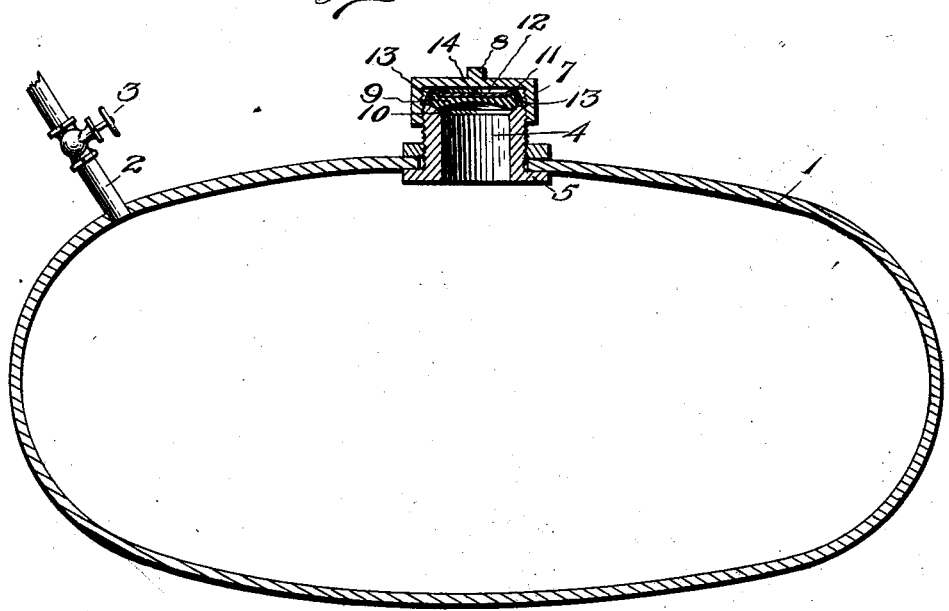
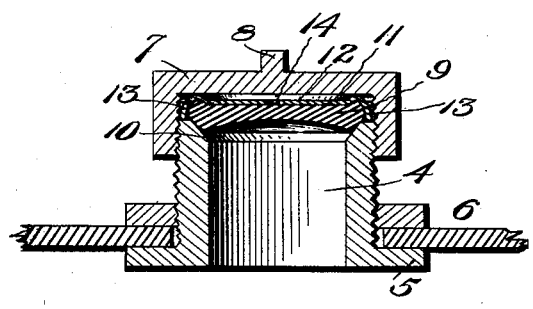
Witnesses
Inventor
P. J. Lockwood,
By
Attorney

UNITED STATES PATENT OFFICE.

PHILO J. LOCKWOOD, OF WASHINGTON, DISTRICT OF COLUMBIA.

GASKET AND SEAL FOR HYDROCARBON-LIQUID CONTAINERS.

SPECIFICATION forming part of Letters Patent No. 699,199, dated May 6, 1902.

Application filed April 30, 1901. Serial No. 58,109. (No model.)

*To all whom it may concern:*

Be it known that I, PHILO J. LOCKWOOD, a citizen of the United States, residing at Washington, in the District of Columbia, have invented certain new and useful Improvements in Gaskets and Seals for Hydrocarbon-Liquid Containers; and I do declare the following to be a full, clear, and exact description of the invention, such as will enable others skilled in the art to which it appertains to make and use the same.

This invention relates to improvements in gaskets and seals for the filling-openings of cans, tanks, and other vessels designed to receive oil, gasolene, and other like volatile liquids, and particularly to a gasket and seal for the liquid-fuel tanks of automobiles, &c., wherein the volatile liquid is stored under air-pressure for feed to the burner or burners. In storage-tanks of this character the filling-opening is formed by a nipple fitted snugly in an aperture in the tank and having a flange to bear against the inner surface of the wall of the tank and reinforced by solder or brazing. The outwardly-projecting portion of this nipple is threaded to receive a nut which clamps it in position and is reinforced by soldering or brazing and a screw-cap which closes the nipple and is designed to prevent the escape of the liquid fuel and compressed air. Owing to the agitation of the fuel set up by the motion of the vehicle and to the fact that said fuel is stored under pressure it has been found necessary to employ a gasket of some kind to prevent the liquid and the vapor-impregnated air from escaping through the filling-opening. The use of rubber for this purpose is impracticable owing to the fact that it is soluble in liquid hydrocarbons and would rapidly deteriorate in use, and as a substitute therefor leather has been employed. The use of leather, however, has been found objectionable, as it lacks the necessary amount of flexibility and resiliency and imperviousness to air and gases to form an absolutely tight joint, quickly hardens, and must be frequently replaced. Furthermore, where leather gaskets are used the screw-cap must be screwed down hard by means of a wrench, the frequent use of which mutilates the screw-threads in the cap, the wrench-flange on the cap, and the nipple-threads to such an extent that in a comparatively short time the cap and nipple are rendered unfit for use and a new cap must be substituted therefor and the tank-nipple replaced. The use of lead and other metals is unsatisfactory because they soon wear out, having neither elasticity or resiliency.

The objects of my invention are, first, to provide a gasket which is highly flexible and resilient, impervious to air hydrocarbon liquids and insoluble therein, adapted to readily conform to the surface to which it is applied and to quickly resume its normal shape by its own resiliency and capable of being seated to form a tight joint under slight pressure; second, to so form the gasket-seat on the nipple as to adapt the gasket to close the joint in the most effective manner, and, third, to provide means for relieving the gasket of excess pressure and undue wear and friction.

With these and other minor objects in view the invention consists of certain novel features of construction, combination, and arrangement of parts, as will be hereinafter more fully described, and particularly pointed out in the appended claims.

In the accompanying drawings, Figure 1 is a vertical longitudinal section through a liquid-hydrocarbon storage-tank, showing the application of my invention thereto. Fig. 2 is a section through the nipple, screw-cap, protecting cap or holder, and gasket on an enlarged scale. Fig. 3 is a perspective view of the gasket.

Referring now more particularly to the drawings, the numeral 1 represents a gasolene or other liquid-hydrocarbon storage-tank of any approved form and general construction, and 2 is the pipe through which the hydrocarbon discharges from the tank, the outflow being regulated by the valve 3. The tank has a filling-opening formed by a nipple or thimble 4, provided at its inner end with a flange 5 to bear against the inner surface of the wall of the tank. The outer surface of the exteriorly-projecting portion of this nipple is threaded to receive a clamping-nut 6, which draws the flange 5 up against the wall of the tank, and a screw-cap 7, which acts as a closure for said nipple, said cap being provided with a flange 8 for the application of a wrench thereto.

The gasket 9 is clamped between the screw-cap 7 and a seat 10, formed therefor upon the upper or outer end of the nipple 4, and is made according to my invention of a composition of glue, water, glycerin, and glucose combined in suitable proportions to form a material resembling rubber and possessing great flexibility and resiliency and the capability of conforming accurately to the shape of the part to which it is applied and upon removal expanding to its normal shape or condition. This material is also impervious to air, gasolene, and other hydrocarbon liquids, and it is insoluble therein, thus making it of great value for use as a seal or packing for cans or storage reservoirs of all kinds in which volatile liquids are stored. In sealing the nipple 4 to form a liquid and air tight joint the gasket 9 is placed upon the seat 10 and the cap 7 screwed down to force said gasket to said seat. Owing to the great flexibility and resiliency of the gasket, but a slight pressure of the cap thereon is necessary to cause it to bear firmly against and to conform accurately to the shape of the seat, and it will be observed that the air-pressure upon and against the gasket serves to force, expand, and squeeze it into any and all apertures of escape. Hence but a slight screwing down of the cap under normal conditions is required, which may be effected by means of the fingers and without the use of a wrench or other form of tool, as ordinarily required. To secure the best results, I preferably make the seat 10 beveled or inclined or flaring, so that the cap 7 when screwed down will cause it to pack more securely against the seat than would otherwise be the case and so that if the liquid within the tank is stored under pressure the pressure of the air acting on the gasket will spread the latter and force the edges thereof into the outer confined space between the upper edge of the beveled seat and the outer edge of the top wall of the cap, thereby closing the minutest point of the joint and sealing it hermetically against the exit of the hydrocarbon liquid and confined air. Owing to the fact that but a slight movement of the cap 7 is required to force the gasket to its seat, the flange 8 may be used as a finger-piece to manipulate said cap, and as the use of a wrench or other form of tool for screwing down or relieving the cap is thus obviated it will be readily seen that mutilation of the flange 8 is avoided and that consequently the cap may be employed for an indefinite period.

As the gasket is sealed securely under slight pressure, it may be found necessary to provide means to protect the gasket and prevent the screw-cap 7 from being screwed down too far on the nipple by a person unfamiliar with the properties of the gasket. To this end I may seat the gasket within a metallic protecting cap or holder 11, the flange of which is of somewhat less depth than the thickness of the gasket to allow the latter to project below the same to bear upon the seat 10, while the lower edge of the flange rests upon the upper edge of the nipple outside said seat, so that when the screw-cap 8 is screwed down the protecting-cap will be forced downward with the gasket, and when said gasket has become compressed to the desired extent the lower edge of the flange will bear upon the upper edge of the nipple and limit the further movement of the screw-cap 7, and consequently the further compression of the gasket, thus preventing the latter from being clamped too tightly. To reduce the contact-surface of the protecting-cap 11, against which the screw-cap 7 bears, and to provide a flat backing for the gasket, I form said protecting-cap with a depressed top 12 and an annular rim 13. This top 12 forms a flat backing-surface for the gasket and the rim 13 a restricted surface for the cap 7 to bear upon, thus obviating a grinding friction otherwise produced when the cap 7 is screwed down and bears upon said protecting-cap, the flaring edges of this backing holding the gasket from the walls of the screw-cap, and the restricted surface bearing against the top of the cap allows the gasket to be forced against the top of the nipple without turning or grinding the gasket. An air-hole 14 is formed in the top 12 to facilitate the insertion and removal of the gasket.

From the forgoing description, taken in connection with the accompanying drawings, the construction and mode of operation of my invention will be readily understood, and it will be seen that the invention provides a gasket and seal which are simple in construction, cheap to manufacture, and capable of application to liquid-hydrocarbon tanks of all kinds having a filling-opening of the character described.

The gasket may be used for general sealing purposes to prevent the escape of air, gasolene, and other hydrocarbon liquids, as it is not affected by such liquids and will form a hermetically-tight joint to prevent the escape thereof.

Having thus fully described my invention, what I claim as new, and desire to secure by Letters Patent of the United States, is—

1. A container having an opening formed with a gasket-seat, a gasket-holder having an annular depending flange of less diameter than the outer wall of said seat and of greater diameter than the inner wall of said seat, a gasket having its edges and upper surface inclosed by said holder, and a confining-cap removably connected to said gasket-seat and designed to clasp the gasket to its seat, substantially as described.

2. The combination with a container having an exteriorly-threaded nipple formed with a flaring gasket-seat; of a gasket-holder provided with a downwardly-extending surrounding flange to engage said seat, a gasket surrounded by said flange and resting upon said seat, and a screw-cap for engaging said nipple and forcing the gasket to its seat, substantially as specified.

3. The combination with a container having an exteriorly-threaded nipple formed with a gasket-seat; of a gasket-holder having a surrounding depending flange and formed with a central depression, said flange adapted to engage said seat, a gasket surrounded by said flange and resting upon said seat, and a screw-cap for engaging said nipple and forcing the gasket to its seat, substantially as set forth.

4. In combination with a liquid-hydrocarbon tank or other vessel having an opening, and having for the purpose of a closure thereof, the externally-threaded nipple, the internally-threaded screw-cap, the gasket and the beveled or concaved gasket-seat, all in combination as hereinbefore described for the uses and purposes herein mentioned.

In testimony whereof I have hereunto set my hand in presence of two subscribing witnesses.

PHILO J. LOCKWOOD.

Witnesses:
 LENA LOCKWOOD,
 NELLA HOOK.